3,371,123
PROCESS FOR PREPARING $CF_3CF_2CHBrCl$
Harry L. Yale, New Brunswick, N.J., assignor to E. R. Squibb & Sons, Inc., New York, N.Y., a corporation of Delaware
No Drawing. Filed May 12, 1967, Ser. No. 637,895
6 Claims. (Cl. 260—653)

ABSTRACT OF THE DISCLOSURE

This invention relates to a new process for preparing 1,1,1,2,2-pentafluoro-3-chloro-3-bromopropane by treating 1,1,1,2,2-pentafluoro-3,3-dichloropropane with an inorganic bromide salt in the presence of a non-protic solvent, such as N,N-dimethylformamide or N,N-dimethylacetamide.

---

1,1,1,2,2-pentafluoro-3-chloro-3-bromopropane ($CF_3CF_2CHBrCl$)

is a known compound possessing anesthetic activity, which previous to this invention has been prepared by a number of methods, most of which involve a reaction conducted at high temperature, i.e. 450–500° C. The high temperature leads to the formation of a large number of by-products and these contaminants are difficult to remove by conventional distillation techniques from the desired $CF_3CF_2CHBrCl$.

It has now been found that the compound can be prepared from 1,1,1,2,2-pentafluoro-3,3-dichloropropane at a comparatively low temperature by reacting the dichloropropane with an inorganic bromide salt in the presence of a non-protic solvent, such as an N,N-di(lower alkyl)-(lower alkanoic acid amide), e.g., N,N-dimethylformamide and N,N-dimethylacetamide. By use of these reactants, the desired 1,1,1,2,2-pentafluoro-3-bromo-3-chloropropane is obtained in substantially pure form since the reaction is carried out at temperatures below about 200° C. and preferably at about 60° C. to about 175° C., and optimally at about 80° C. to about 150° C.

Among the suitable inorganic bromide salts can be mentioned the alkali metal bromides, such as lithium bromide, potassium bromide, rubidium bromide and cesium bromide; the alkaline earth metal bromides, such as calcium bromide, strontium bromide and barium bromide; and, preferably, ammonium bromide and sodium bromide.

The reaction is preferably carried out employing at least one mole of bromide salt per mole of $CF_3CF_2CHCl_2$.

The following examples illustrate the invention (all temperatures being in centigrade):

Example 1

A mixture of 600 g. of dry N,N-dimethylformamide and 98.4 g. of dried ammonium bromide in a pressure vessel is stirred at 95° until homogeneous. Into the stirred mixture under pressure is introduced $CF_3CF_2CHCl_2$ at the rate of 10 g./min. maintaining the temperature at 90–150°. When 203 g. of the $CF_3CF_2CHCl_2$ has been introduced, the vessel is sealed and the stirring and heating at 90–150° continued for about 10 hours. The vessel is cooled, the contents discharged, and fractionated to give about 227.5 g. of $CF_3CF_2CHBrCl$, B.P. about 70.2–70.5°, with a purity of 99.5%.

Example 2

To a suspension of 103 g. of dried sodium bromide in 600 ml. of dry N,N-dimethylformamide at room temperature is added 203 g. of $CF_3CF_2CHCl_2$. The mixture is stirred vigorously and heated slowly until the internal temperature reaches about 80° and the temperature is maintained at about 80° for 8 hours. Efficient cooling is required in the condenser to prevent loss of the volatile reactant and product. The mixture is cooled, the condenser is replaced by a fractionating column and the reaction mixture distilled, first to remove about 23 g. of $$CF_3CF_2CHCl_2$$

B.P. about 44.5°, and then to collect about 233.2 g. of $CF_3CF_2CHBrCl$, B.P. about 70.2–70.5° with a purity of 99.7%.

Example 3

By substituting 213 g. of cesium bromide for the sodium bromide and 500 ml. of dry N,N-dimethylacetamide for the N,N-dimethylformamide in Example 2, there is obtained about 199.3 g. of $CF_3CF_2CHBrCl$, B.P. about 70.2–70.5°, with a purity of 99.4%.

Example 4

By substituting 138 g. of barium bromide for the sodium bromide in Example 2, there is obtained about 160.3 g. of $CF_3CF_2CHBrCl$, B.P. about 70.2–70.5°, with a purity of 99.2%.

The invention may be variously otherwise embodied within the scope of the appended claims.

What is claimed is:

1. A process for preparing 1,1,1,2,2-pentafluoro-3-bromo-3-chloropropane, which comprises interacting 1,1,1,2,2-pentafluoro-3,3-dichloropropane with an inorganic bromide salt selected from the group consisting of ammonium bromide, alkali metal bromides and alkaline earth metal bromides in the presence of a non-protic solvent at a temperature of about 60° C. to about 175° C.

2. The process of claim 1, wherein the reaction is carried out at a temperature of about 90° C. to about 150° C.

3. The process of claim 2, wherein the salt is ammonium bromide.

4. The process of claim 3, wherein the solvent is N,N-dimethylformamide.

5. The process of claim 2, wherein the salt is sodium bromide.

6. The process of claim 2, wherein the solvent is N,N-dimethylacetamide.

References Cited

UNITED STATES PATENTS

| | | | |
|---|---|---|---|
| 3,287,425 | 11/1966 | Maynard | 260—653.3 |
| 3,288,877 | 11/1966 | Taylor et al. | 260—653.3 |

DANIEL D. HORWITZ, *Primary Examiner.*